(12) United States Patent
Sikri et al.

(10) Patent No.: US 8,737,499 B2
(45) Date of Patent: May 27, 2014

(54) ADVANCED INTERFERENCE CANCELLATION FOR PRECODED GSM EDGE RADIO ACCESS NETWORK (GERAN)

(75) Inventors: Divaydeep Sikri, Farnborough (GB); Farrokh Abrishamkar, San Diego, CA (US); Bahadir Canpolat, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/477,288

(22) Filed: May 22, 2012

(65) Prior Publication Data

US 2013/0128942 A1 May 23, 2013

Related U.S. Application Data

(60) Provisional application No. 61/548,075, filed on Oct. 17, 2011.

(51) Int. Cl.
*H04K 1/10* (2006.01)
*H04L 27/28* (2006.01)

(52) U.S. Cl.
USPC ........... 375/260; 375/229; 375/346; 375/299; 370/208

(58) Field of Classification Search
CPC .......................... H04B 1/405; H04L 25/03821
USPC .................... 375/260, 229, 346, 299; 370/208
See application file for complete search history.

(56) References Cited

U.S. PATENT DOCUMENTS

| | | | |
|---|---|---|---|
| 7,889,806 B2 | 2/2011 | Belogolovy et al. | |
| 7,995,688 B2 | 8/2011 | Hong et al. | |
| 2005/0129136 A1* | 6/2005 | Fujii et al. | 375/260 |
| 2007/0217546 A1* | 9/2007 | Sandell et al. | 375/299 |
| 2008/0240314 A1* | 10/2008 | Gaal et al. | 375/346 |
| 2009/0122897 A1* | 5/2009 | Belogolovy et al. | 375/267 |
| 2009/0285317 A1* | 11/2009 | Kim et al. | 375/260 |
| 2011/0007792 A1 | 1/2011 | Kimata | |
| 2011/0150153 A1 | 6/2011 | Liu et al. | |

FOREIGN PATENT DOCUMENTS

WO 2011002079 A1 1/2011

OTHER PUBLICATIONS

Balan, M.M., et al., "The Iteration Algorithm of the Harmonic Equalizer Parameters Optimization by Coordinatewise Descent Method", Ministry of Transport and Telecommunications of Ukraineodesa National O.S. Popov Academy of Telecommunications, Nov. 4, 2010, pp. 1-16, XP002690621, Ukraine paragraph [0007].
International Search Report and Written Opinion—PCT/US2012/060654—ISA/EPO—Feb. 4, 2013.

(Continued)

*Primary Examiner* — Sam K Ahn
*Assistant Examiner* — Fabricio R Murillo Garcia
(74) *Attorney, Agent, or Firm* — Donald C. Kordich

(57) ABSTRACT

An interference cancellation receiver for a pre-coded orthogonal frequency division multiplexed (OFDM) based system combines temporal interference cancellation within the OFDM framework. Multi-path equalization and inter-symbol interference (ISI) cancellation are performed on a time domain channel estimate of a received signal. An output from the multi-path equalization is transformed to the frequency domain. Inter-channel interference (ICI) is performed in the frequency domain on an equalized signal from the multi-path equalization after transforming the equalized signal from the time domain to the frequency domain.

16 Claims, 8 Drawing Sheets

(56) References Cited

OTHER PUBLICATIONS

"Li et al. "On Single Carrier MIMO Time Domain Equalization for Gbits High Frequency Band". 2011 IEEE International Symposium on Broadband Multimedia Systems and Broadcasting [Online] 2011, pp. 1-5".

Nokia Siemens Networks et al: "On opening a work item on Precoded EGPRS2", 3GPP Draft; GP-100837 Concerns on PC-EGPRS2 WID, 3rd Generation Partnership Project (3GPP), Mobile Competence Centre ; 650, Route Des Lucioles ; F-06921 Sophia-Antipolis Cedex ; France, vol. TSG GERAN, no. Jeju Island, South Korea; May 17-21, 2010, May 16, 2010, XP050594783, [retrieved on 2010-G5-16] paragraph [0002].

Telefon AB LM Ericsson et al: "Precoded EGPRS2 (update of GP-100918)", 3GPP Draft; GP-101066 Precoded EGPRS2 Downlink (Update of GP100918), 3rd Generation Partnership Project (3GPP), Mobile Competence Centre ; 650, Route Deslucioles ; F-06921 Sophia-Antipolis Cedex ; France, vol. TSG GERAN, no. Jeju; May 17, 2010, May 20, 2010, XP050417302, [retrieved on May 20, 2010] paragraph [03.1]-paragraph [03.2].

Yu-Li You et al: "Blind equalization by alternating minimization for applications to mobile communications", Global Telecommunications Conference, 1995, Conference Record, C0mmunication Theory Mini-Conference, Gl0becom '95, IEEE Singapore Nov. 13-17, 1995, New York, NY, USA, IEEE, US, vol. 1, Nov. 13, 1995, pp. 88-92, XP010607533, DOI: 10.1109/GLOCOM.1995.500227 ISBN: 978-0-7803-2509-8 paragraph [0002]-paragraph [0003].

\* cited by examiner

ADVANCED INTERFERENCE CANCELLATION FOR PRECODED GSM EDGE RADIO ACCESS NETWORK (GERAN)

CROSS REFERENCE TO RELATED APPLICATIONS

This application claims the benefit of U.S. Provisional Patent Application No. 61/548,075 filed Oct. 17, 2011, entitled "ADVANCED INTERFERENCE CANCELLATION FOR PRECODED GSM EDGE RADIO ACCESS NETWORK (GERAN)", the disclosure of which is expressly incorporated by reference herein in its entirety.

The present Application for Patent is related to U.S. patent application Ser. No. 12/038,724, entitled "COHERENT SINGLE ANTENNA INTERFERENCE CANCELLATION FOR GSM/GPRS/EDGE," filed Feb. 27, 2008 and issued as U.S. Pat. No. 7,933,256, assigned to the assignee hereof, and expressly incorporated by reference herein in its entirety.

The present Application for Patent is related to co-pending U.S. patent application Ser. No. 12/464,311, entitled "TWO DIMENSIONAL SEARCH FOR GERAN: OPTIMAL TIMING AND CARRIER RECOVERY," filed May 12, 2009, assigned to the assignee hereof, and expressly incorporated by reference herein in its entirety.

The present Application for Patent is related to co-pending U.S. patent application Ser. No. 12/193,995, entitled "ENHANCED GERAN RECEIVER USING CHANNEL INPUT BEAMFORMING," filed Aug. 19, 2008, assigned to the assignee hereof, and expressly incorporated by reference herein in its entirety.

The present Application for Patent is related to co-pending U.S. patent application Ser. No. 12/478,195, entitled "ITERATIVE INTERFERENCE CANCELLATION RECEIVER," filed Jun. 4, 2009, assigned to the assignee hereof, and expressly incorporated by reference herein in its entirety.

The present Application for Patent is related to co-pending U.S. patent application Ser. No. 12/553,855, entitled "SYMBOL ESTIMATION METHODS AND APPARATUSES," filed Sep. 3, 2009, assigned to the assignee hereof, and expressly incorporated by reference herein in its entirety.

This present Application for Patent is related to co-pending U.S. patent application Ser. No. 12/553,848, entitled "MULTISTAGE INTERFERENCE SUPPRESSION," filed Sep. 3, 2009, assigned to the assignee hereof, and expressly incorporated by reference herein in its entirety.

BACKGROUND

1. Field

The present disclosure relates to wireless communication and, in particular, relates to interference cancellation at a receiver.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

SUMMARY

According to aspects of the present disclosure, a method for wireless communication includes performing a first frequency domain channel estimation on a received orthogonal frequency division multiplexed (OFDM) signal to generate a first frequency domain channel estimate, transforming the first frequency domain channel estimate to a first time domain channel estimate and performing a cancellation of co-channel interference with a multipoint equalization block in the time domain using the first time domain channel estimate. The method also includes performing a cancellation of residual inter-symbol interference by a first cyclic coordinate ascend section in the time domain and performing a cancellation of inter-carrier interference on the received OFDM signal by a second cyclic coordinate ascend section in the frequency domain.

An apparatus for wireless communication according to aspects of the present disclosure includes means for performing a first frequency domain channel estimation on a received OFDM signal to generate a first frequency domain channel estimate, means for transforming the first frequency domain channel estimate to a first time domain channel estimate and means for performing a cancellation of co-channel interference with a multipoint equalization block in the time domain using the first time domain channel estimate. The apparatus also includes means for performing a cancellation of residual inter-symbol interference by a first cyclic coordinate ascend section in the time domain and means for performing a cancellation of inter-carrier interference on the received OFDM signal by a second cyclic coordinate ascend section in the frequency domain.

Another aspect of the present disclosure includes a computer program product for wireless communication in a wireless network. The computer program product includes a non-transitory computer-readable medium having non-transitory program code recorded thereon. The program code includes program code to perform a first frequency domain channel estimation on a received OFDM signal to generate a first frequency domain channel estimate, program code to transform the first frequency domain channel estimate to a first time domain channel estimate and program code to perform a cancellation of co-channel interference with a multipoint equalization block in the time domain using the first time domain channel estimate. The program code also includes program code to perform a cancellation of residual inter-symbol interference by a first cyclic coordinate ascend section in the time domain and program code to perform a cancellation of inter-carrier interference on the received OFDM signal by a second cyclic coordinate ascend section in the frequency domain.

Another aspect of the present disclosure includes an apparatus for wireless communication including a memory and at least one processor coupled to the memory. According to this aspect of the disclosure, the processor(s) is configured to perform a first frequency domain channel estimation on a received OFDM signal to generate a first frequency domain channel estimate. The processor(s) is also configured to transform the first frequency domain channel estimate to a first time domain channel estimate and to perform a cancellation of co-channel interference with a multipoint equalization block in the time domain using the first time domain channel estimate. The processor(s) is also configured to perform a cancellation of residual inter-symbol interference by a first cyclic coordinate ascend section in the time domain and to perform a cancellation of inter-carrier interference on the received OFDM signal by a second cyclic coordinate ascend section in the frequency domain.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA) and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for EGPRS (enhanced general packet radio service) and use such EGPRS terminology in much of the description below.

Figure 1:
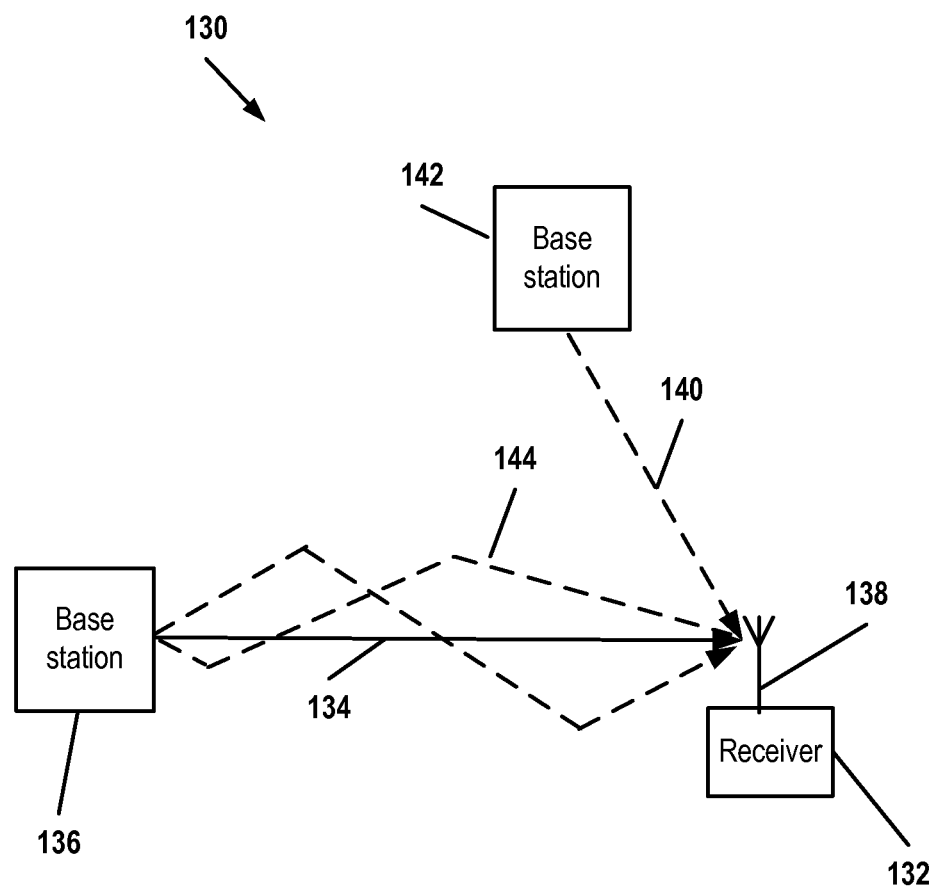
FIG. 1 is a block diagram conceptually illustrating an example of interference in a telecommunications system.

FIG. 1 shows a wireless communication network 130, which may be an EGPRS (enhanced general packet radio service) network, configured to perform interference cancellation according to aspects of the present disclosure. The wireless network 130 includes a number of base stations 136, 142 and other network entities. A base station may be a station that communicates with the UEs and may also be referred to as an eNodeB, a node B, an access point, and the like. Each base station may provide communication coverage for a particular geographic area. In 3GPP, the term "cell" can refer to this particular geographic coverage area of an eNodeB and/or an eNodeB subsystem serving the coverage area, depending on the context in which the term is used.

Receivers 132 are dispersed throughout the wireless network 130, and each receiver may be stationary or mobile. A receiver may also be referred to as a terminal, a user terminal, a mobile station, a subscriber unit, a station, a user equipment (UE) or the like. A receiver may be a cellular phone (e.g., a smart phone), a personal digital assistant (PDA), a wireless modem, a wireless communication device, a handheld device, a laptop computer, a cordless phone, a wireless local loop (WLL) station, a tablet, a netbook, a smart book, or the like.

Receivers operating in accordance with certain wireless standards, such as GERAN, often receive signals over a channel that may be characterized as a fading channel. Operation of a receiver often involves receiving a signal, extracting symbols from the received signal and demodulating the symbols to produce data bits. To help produce the data bits accurately, a receiver may also suppress (or remove) signal distortions caused by the communication channel, noise, interference from unwanted transmitters, and so on.

Receivers are often designed by making assumptions about communication channels (e.g., assuming that a communication channel has a finite impulse response of a certain duration) and noise signal (e.g., assuming that noise has a white spectrum). Based on the assumptions, a practitioner of the art may configure a receiver to suppress the signal distortions by performing channel equalization using, for example, maximum likelihood (ML) detection, decision feedback equalization (DFE), minimum least squares estimate (MLSE) and other well-known algorithms. While algorithms such as the MLSE may provide optimal results in many applications, MLSE tends to be computationally expensive, making it an unattractive option for implementation at a resource-limited wireless device. Furthermore, computational complexity of the MLSE algorithm increases non-linearly with increasing constellation density of the received signals. Therefore, in communications network that use higher order modulation schemes (e.g., 8 PSK), a channel equalization and/or an interference suppression technique that is computationally less expensive than MLSE is desirable.

Channel equalization techniques using MLSE are generally called "non-linear" channel equalization techniques. Other techniques such as channel equalization using a liner combiner, are generally called "linear" channel equalization techniques. Broadly speaking, MLSE algorithm works better than other techniques when some information is available about a channel and/or received signal amplitude distortion is severe. In certain aspects, configurations of the present disclosure provide methods and systems where channel equalization and interference suppression may be performed using either a non-linear technique, such as MLSE, or a linear technique such as a linear combiner, based on certain operational conditions of the receiver. These operational conditions include, for example, constellation density of the received signal and severity of distortion in the received signal. In one aspect, such architecture is advantageous for a receiver expected to receive signals with different modulation schemes in the same network. For example, the GERAN Evolution standard uses modulation schemes including GMSK, QPSK, 8 PSK, 16-QAM and 32-QAM.

In communication systems utilizing GSM, GPRS, EDGE or the like, a receiver's ability to properly decode a received signal generally depends upon the receiver's ability to effectively suppress co-channel interference (CCI) and inter-symbol interference (ISI). As wireless communications become ever more prevalent, increasing amounts of CCI and ISI can negatively affect a receiver's ability to suppress interference.

Aspects of the present disclosure utilize signal reception techniques where a receiver is operationally optimal in the sense of reducing or minimizing probability of error as described in co-pending U.S. patent application Ser. No. 12/553,848, entitled "MULTISTAGE INTERFERENCE SUPPRESSION," filed Sep. 3, 2009, the disclosure of which is expressly incorporated herein by reference in its entirety. In one aspect, a receiver suppresses interference blindly. In another aspect, a receiver uses signal processing techniques having relatively low complexity. In yet another aspect, a receiver is robust to frequency differential between a desired signal and interference. In certain aspects, the present disclosure provides signal reception techniques applicable to a multi-input multi-output (MIMO) channel. In certain configurations, a MIMO channel is characterized by having multiple receive antennas at a receiver configured to receive signals from multiple transmit antennas at a transmitter.

Broadly and generally speaking, in certain aspects, the present disclosure provides an interference cancellation receiver for a pre-coded OFDM radio access technology based system, such as GERAN (GSM EDGE radio access network). According to aspects of the present disclosure, the interference cancellation receiver combines interference cancellation in the time domain within the OFDM framework.

The following abbreviations are used throughout the disclosure.
CCI=co-channel interference
EDGE=enhanced data rate for GSM evolution
eSAIC=enhanced single antenna interference cancellation
FER=frame error rate
GERAN=GSM EDGE radio access network
GP=guard period
GSM=Global Standard for Mobile communication (Groupe Mobil Special)
IC=interference cancellation/canceller
ISI=inter-symbol interference
LLR=log-likelihood ratio
MDD=minimum distance detector
MEQ=multiple stream equalizer
MIMO=Multiple input multiple output
ML=maximum likelihood
MLSE=maximum likelihood sequence estimator
MMSE=minimum mean squared error
MSIC=multiple stream inter-symbol interference cancellation
PHIC=parallel hierarchical interference cancellation
PSK=phase shift keying
RLS=recursive least squares
RSSE=Reduced state sequence estimation
SER=symbol error rate
SNR=signal to noise ratio
TDMA=time domain multiple access FIG. 1 illustrates a communication system 130 in accordance with one aspect of the subject technology. The communication system 130 may, for example, be a wireless communication system based on the GSM standard. A receiver 132 receives a signal 134 transmitted by a base station 136 at an antenna 138 coupled to the receiver 132. However, as illustrated, the signal 134 may suffer from impediments such as co-channel interference (CCI), including a transmission 140 from another base station 142, and inter-symbol interference (ISI) comprising one or more reflections 144 of the signal 134. Accordingly, in certain aspects, the receiver 132 processes the signal 134 to suppress effects of CCI and ISI and recover the data transmitted by the base station 136 by estimating received symbols. While FIG. 1 depicts a single antenna 138 for the sake of clarity, it is contemplated that configurations of the present disclosure also include MIMO transmission systems and as such the receiver 102 may have multiple antennas to receive the signal 104.

Figure 2:
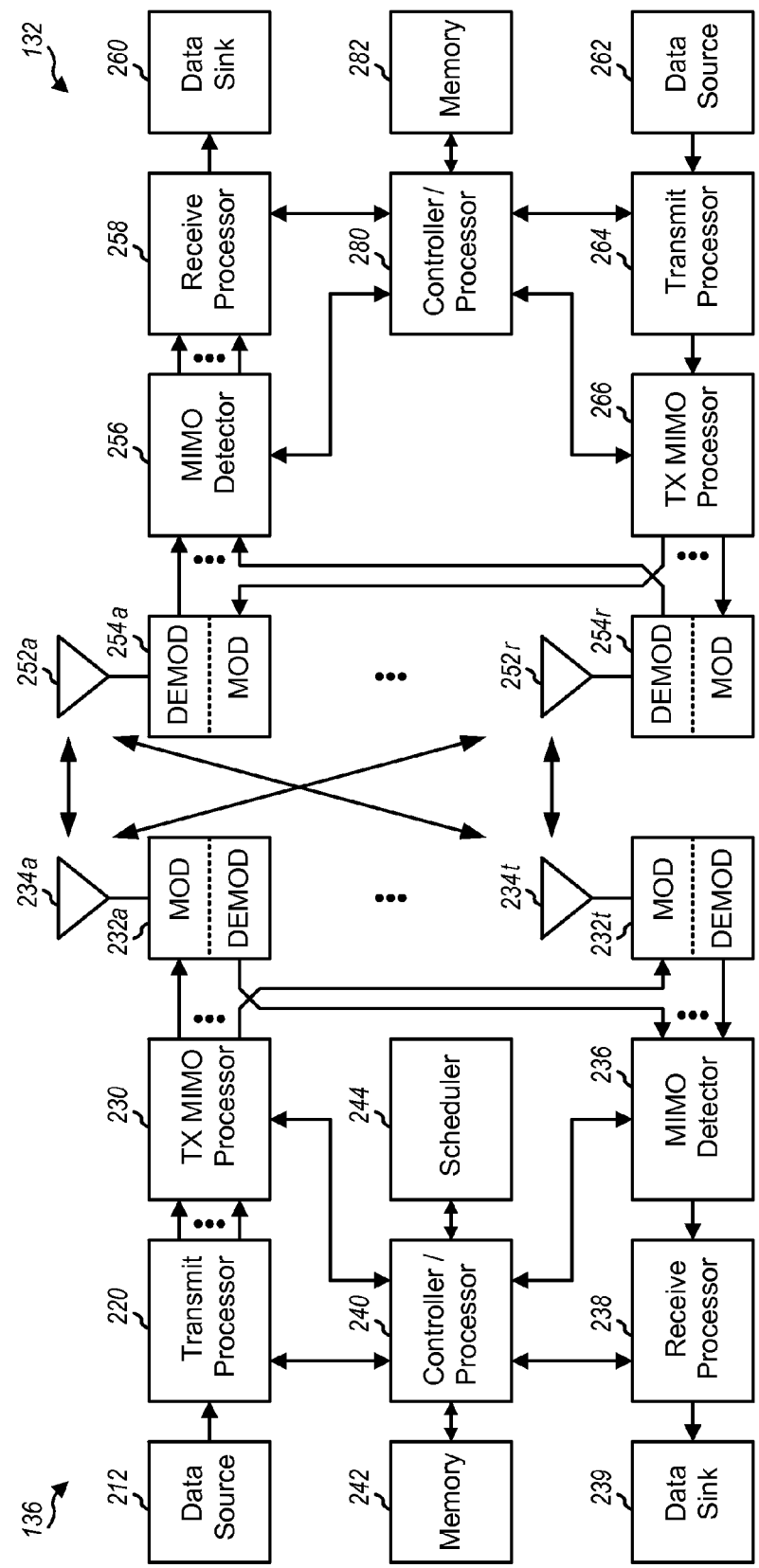
FIG. 2 is a block diagram conceptually illustrating a design of a base station/eNodeB and a UE configured according to an aspect of the present disclosure.

FIG. 2 shows a block diagram of a design of a base station 136, 142 and a receiver 132, which may be one of the base stations and one of the receivers in FIG. 1. The base station 136 may be equipped with one or more antennas 234a through 234t, and the receiver 132 may be equipped with one or more antennas 252a through 252r.

At the base station 136, a transmit processor 220 may receive data from a data source 212 and control information from a controller/processor 240. The processor 220 may process (e.g., encode and symbol map) the data and control information to obtain data symbols and control symbols, respectively. The processor 220 may also generate reference symbols. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the receiver 132, the antennas 252a through 252r may receive the downlink signals from the base station 136 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from the demodulators 254a through 254r, perform MIMO detection on the received symbols if applicable, and provide detected symbols. A receive processor 258 may process (e.g., demodulate, deinterleave, and decode) the detected symbols, provide decoded data for the receiver 132 to a data sink 260, and provide decoded control information to a controller/processor 280.

On the uplink, at the receiver 132, a transmit processor 264 may receive and process data from a data source 262 and control information from the controller/processor 280. The processor 264 may also generate reference symbols for a reference signal. The symbols from the transmit processor 264 may be precoded by a TX MIMO processor 266 if applicable, further processed by the demodulators 254a through 254r (e.g., for SC-FDM, etc.), and transmitted to the base station 136. At the base station 136, the uplink signals from the receiver 132 may be received by the antennas 234, processed by the modulators 232, detected by a MIMO detector 236 if applicable, and further processed by a receive processor 238 to obtain decoded data and control information sent by the receiver 132. The processor 238 may provide the decoded data to a data sink 239 and the decoded control information to the controller/processor 240.

The controllers/processors 240 and 280 may direct the operation at the base station 136 and the receiver 132, respectively. The processor 240 and/or other processors and modules at the base station 136 may perform or direct the execution of various processes for the techniques described herein. The processor 280 and/or other processors and modules at the receiver 132 may also perform or direct the execution of the functional blocks illustrated in FIG. 6, and/or other processes for the techniques described herein. The memories 242 and 282 may store data and program codes for the base station 136 and the receiver 132, respectively. A scheduler 244 may schedule receivers for data transmission on the downlink and/or uplink.

In one configuration, the base station 136 and/or the receiver 132 includes means for implementing multi-point linear equalization (MEQ) techniques for suppression of inter-symbol interference (ISI) according to aspects of the present disclosure. Parallel inter-symbol interference cancellation using hidden Markov model (HMM) techniques provide signal conditioning with ISI and also provide a soft metric for the decoder. According to one aspect of the disclosure, the HMM techniques include expectation maximization/Baum Welch (EM-BW) algorithms.

Receivers operating in accordance with certain wireless standards, such as LTE and GERAN, often receive signals over a channel that may be characterized as a fading channel. Operation of a receiver involves receiving a signal, extracting symbols from the received signal and demodulating the symbols to produce data bits. To help produce the data accurately, a receiver may also suppress or remove signal distortions caused by the communication channel, noise, and interference from unwanted transmitters, for example.

Figure 3:
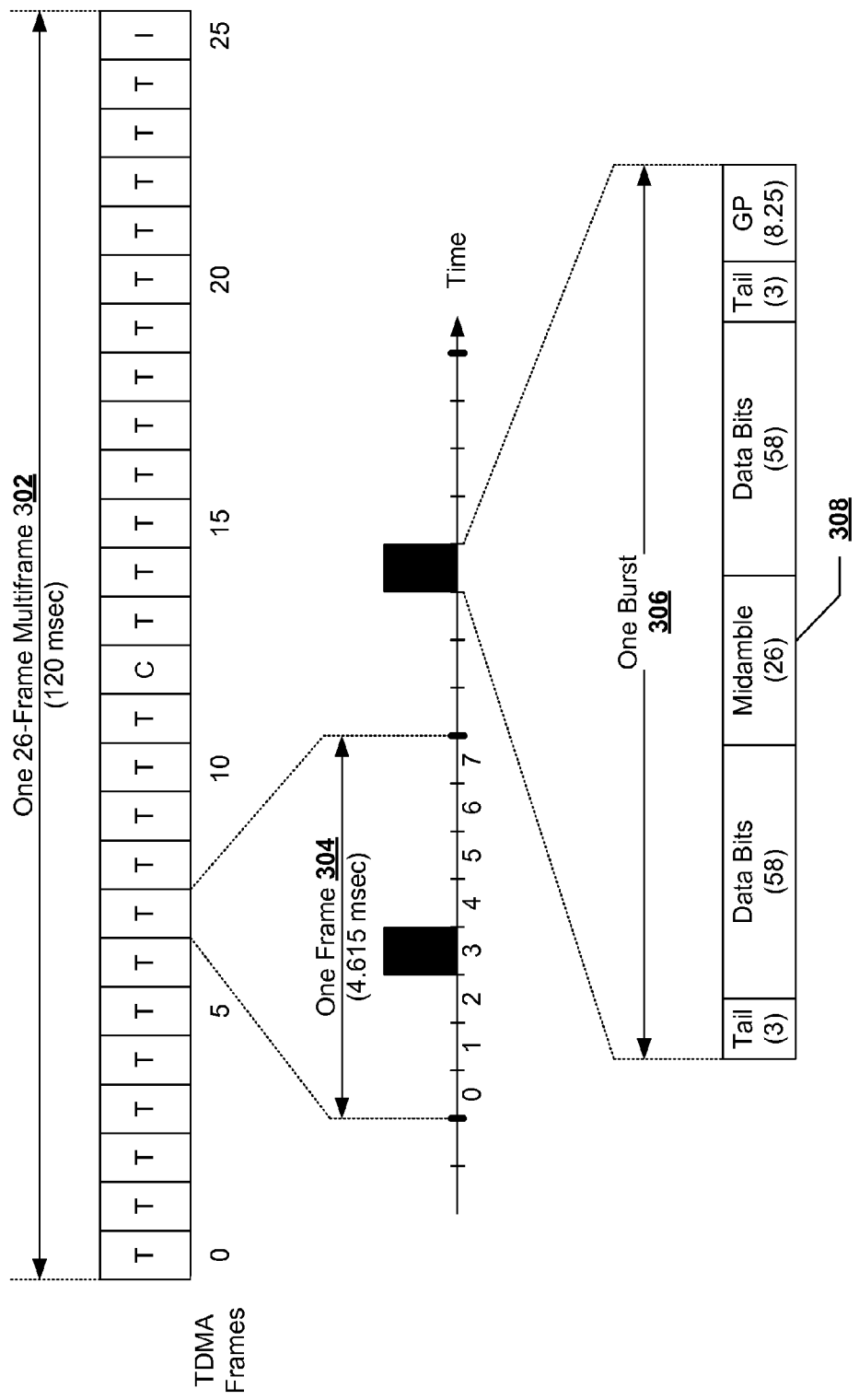
FIG. 3 is illustrates exemplary frame and burst formats in a GSM transmission, in accordance with certain configurations of the present disclosure.

FIG. 3 shows exemplary frame and burst formats in GSM. The timeline for downlink transmission is divided into multiframes. For traffic channels used to send user-specific data, each multiframe, such as exemplary multiframe 302, includes 26 TDMA frames, which are labeled as TDMA frames 0 through 25. The traffic channels are sent in TDMA frames 0 through 11 and TDMA frames 13 through 24 of each multiframe, as identified by the letter "T" in FIG. 3. A control channel, identified by the letter "C," is sent in TDMA frame 12. No data is sent in the idle TDMA frame 25 (identified by the letter "I"), which is used by the wireless devices to make measurements for neighbor base stations.

Each TDMA frame, such as exemplary TDMA frame 304, is further partitioned into eight time slots, which are labeled as time slots 0 through 7. Each active wireless device/user is assigned one time slot index for the duration of a call. User-specific data for each wireless device is sent in the time slot assigned to that wireless device and in TDMA frames used for the traffic channels.

The transmission in each time slot is called a "burst" in GSM. Each burst, such as exemplary burst 306, includes two tail fields, two data fields, a training sequence (or midamble) field, and a guard period (GP). The number of bits in each field is shown inside the parentheses. GSM defines eight different training sequences that may be sent in the training sequence field. Each training sequence, such as midamble 308, contains 26 bits and is defined such that the first five bits are repeated and the second five bits are also repeated. Each training sequence is also defined such that the correlation of that sequence with a 16-bit truncated version of that sequence is equal to (a) sixteen for a time shift of zero, (b) zero for time shifts of ±1, ±2, ±3, ±4, and ±5, and (3) a zero or non-zero value for all other time shifts.

The pulse shape of GSM signaling causes significant inter-symbol interference (ISI) which is generally removed by equalizer circuitry in a GSM receiver. Equalizer circuitry in a GSM receiver for removing interference in higher order modulation schemes such as 16-QAM, 32-QAM or 64-QAM can become significantly complex and computationally expensive. Pre-coding in a transmitter may be performed to reduce the cost and complexity of interference cancellation in receiver circuitry, for example. The pre-coded signal can be received by applying a transfer function on the receiver side, without complex equalization.

Figure 4A:
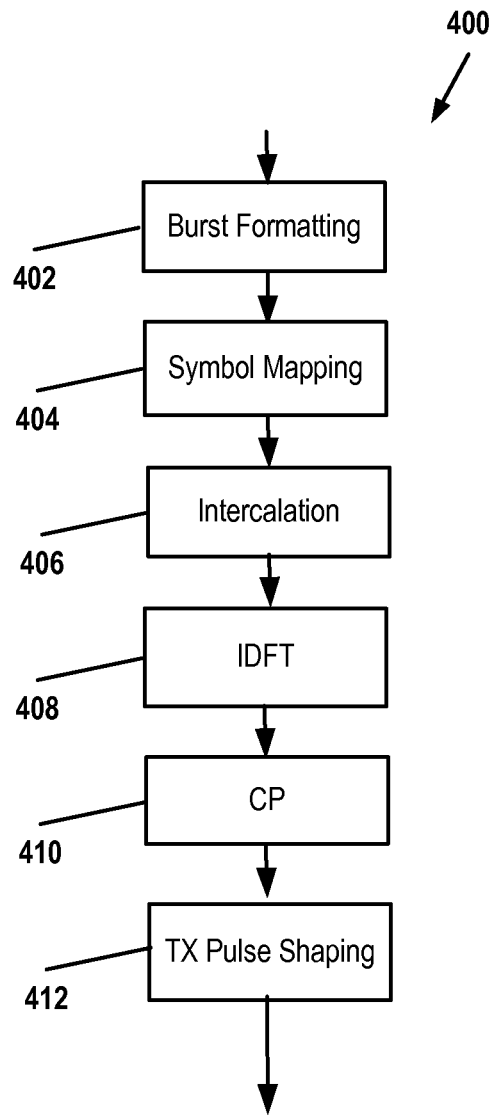
FIG. 4A is a block diagram conceptually illustrating an exemplary transmitter system.

FIG. 4A is a block diagram of a transmitter 400 configured with an inverse discrete Fourier transform (IDFT) pre-coder block 408 for pre-coding of a GSM signal. The transmitter 400 includes a burst formatting block 402, a symbol mapping block 404, an intercalation block 406, an IDFT pre-coder block 408, a cyclic prefix block 410 and a transmit pulse shaping block 412.

The burst formatting block 402 formats user code bits for transmission along with training sequences in a burst 405. In a proposed pre-coding transmitter configuration, the burst 405 includes a set of 26 training symbols and 58 data symbols on each side of the training sequence. The symbol mapping block 404 maps the burst to modulation symbols such as PSK/QAM modulation symbols. The intercalation block 406 disperses the training sequences among the data sequences in accordance with a predetermined format.

In the proposed configuration, each of the symbols represents a 1.9 kHz sub-band 414 of a 270 kHz band in the frequency domain. The IDFT pre-coding block 408 performs an inverse discrete Fourier transform on the symbols to generate an IDFT precoded signal. The IDFT precoded signal in a burst format is represented in Equation (1) below:

$$d_{N\times 1} = W_{N\times N}^H s_{N\times 1} \quad (1)$$

in which $s_{N\times 1}$ is a vector representation of N transmit symbols, $W_{N\times N}^H$ defines the IDFT pre-coder matrix; and $d_{N\times 1}$ is the vector representation of the pre-coded symbol.

The cyclic prefix block 410 adds a cyclic prefix to the time domain signal output from the IDFT. The cyclic prefix spans the maximum channel dispersion and has a length of 6-8 symbols to span the maximum dispersion of GERAN channels, for example. Equation (2) below represents a cyclic prefix matrix $C_{(N+L)\times N}$ applied to the pre-coded signal for N transmit symbols and L taps to mitigate intersymbol interference.

$$\tilde{d}_{(N+L)\times 1} = C_{(N+L)\times N} d_{N\times 1} = C_{(N+L)\times N} W_{N\times N}^H s_{N\times 1} \quad (2)$$

The transmit pulse shaping block 412 generates a pulse shape for transmission in accordance with a pulse shape defined by standards to conform with a predetermined spectrum mask.

Figure 4B:
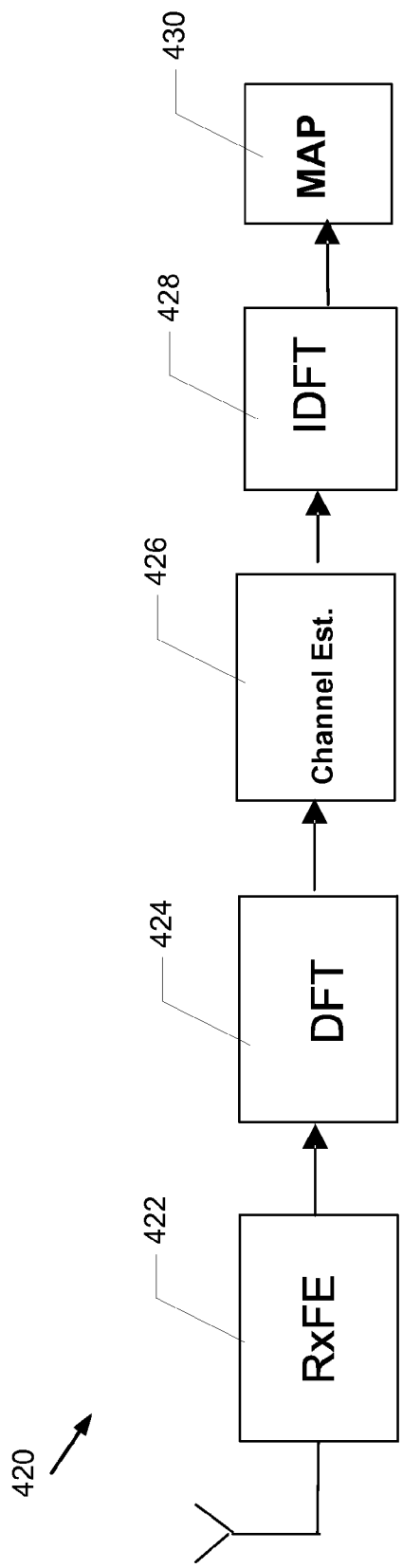
FIG. 4B is a block diagram conceptually illustrating an exemplary receiver system.

FIG. 4B is a block diagram of a receiver 420 configured with a discrete Fourier transform (DFT) pre-decoder block 424. The receiver 420 includes a receive filter block 422 coupled to the DFT pre-decoder block 424, a channel estimator block 426, an inverse discrete Fourier transform (IDFT) block 428 and a maximum a posteriori probability (MAP) block 430. The receive filter block 422 captures the transmitted data and the DFT pre-decoder block performs a discrete Fourier transform on the data to generate frequency domain received symbols.

The DFT pre-decoder block 424, channel estimator block 426 and IDFT block 428 perform channel estimation based on the pre-coded received symbols. The pre-coded signal after passing through a channel to a receiver is received in the time domain as follows:

$$x_{N\times 1} = h_{N\times (N+L)} \tilde{d}_{(N+L)\times 1} + v_{N\times 1} \quad (3)$$

in which matrix $h_{N\times(N+L)}$ represents the channel and $v_{N\times 1}$ is a vector representing noise.

The DFT pre-decoder block 424 in the receiver applies a DFT Transform matrix $W_{N\times N}$ to the time domain received signal $x_{N\times 1}$ to generate a frequency domain received signal $X_{N\times 1}$ in which:

$$\begin{aligned} X_{N\times 1} &= W_{N\times N} x_{N\times 1} \quad (4) \\ &= W_{N\times N} h_{N\times (N+L)} C_{(N+L)\times N} W_{N\times N}^H + W_{N\times N} v_{N\times 1} \\ &= W_{N\times N} \tilde{h}_{N\times N} W_{N\times N}^H s_{N\times 1} + \tilde{v}_{N\times 1} \end{aligned}$$

In Equation 4, $\tilde{h}_{N\times N}$ is the circular matrix representation of channel h due to the cyclical prefix matrix.

The DFT matrix $W_{N\times N}$ and IDFT matrix $W_{N\times N}^H$ transform the circular channel matrix, $\tilde{h}_{N\times N}$ into a diagonal matrix $\Lambda_{N\times N}$, in which $\Lambda_{N\times N} = W_{N\times N} \tilde{h}_{N\times N} W_{N\times N}^H$.

A set of N single-in single-out (SISO) signal models that can be represented in terms of the diagonal matrix $\Lambda_{N\times N}$, as $R_{N\times 1}$ is shown in Equation (5):

$$R_{N\times 1} = \Lambda_{N\times N} s_{N\times 1} + \tilde{v}_{N\times 1} \quad (5)$$

In Equation 5, above, $X_{N\times 1}$ represents a set of N single-in single-out (SISO) signal models that can be equalized given $\Lambda_{N\times N}$ by maximum a posteriori probability (MAP) in MAP block 430 to determine the vector $s_{N\times 1}$ representing the N transmit signals.

The equalization scheme described above, which directly performs MAP based in the $\Lambda_{N\times N}$ matrix, does not perform well in the presence of interference such as co-channel interference or adjacent channel interference.

Advanced Interference Cancellation for Precoded Geran

Aspects of the present disclosure combine multi-stream equalization and interference cancellation with the pre-coding/pre-decoding schemes described above to provide a low complexity receiver that performs well in the presence of interference. Aspects of the present disclosure employ interference cancellation in the time domain for interference cancellation within an OFDM radio access technology framework. For example, the techniques described may be used with GERAN (GSM EDGE radio access network) systems. Certain multi-stream equalization and interference cancellation techniques that may be utilized according to aspects of the present disclosure are described in co-pending U.S. patent application Ser. No. 12/553,848, entitled "MULTISTAGE INTERFERENCE SUPPRESSION," filed Sep. 3, 2009, the disclosure of which is expressly incorporated herein by reference in its entirety.

Figure 5:
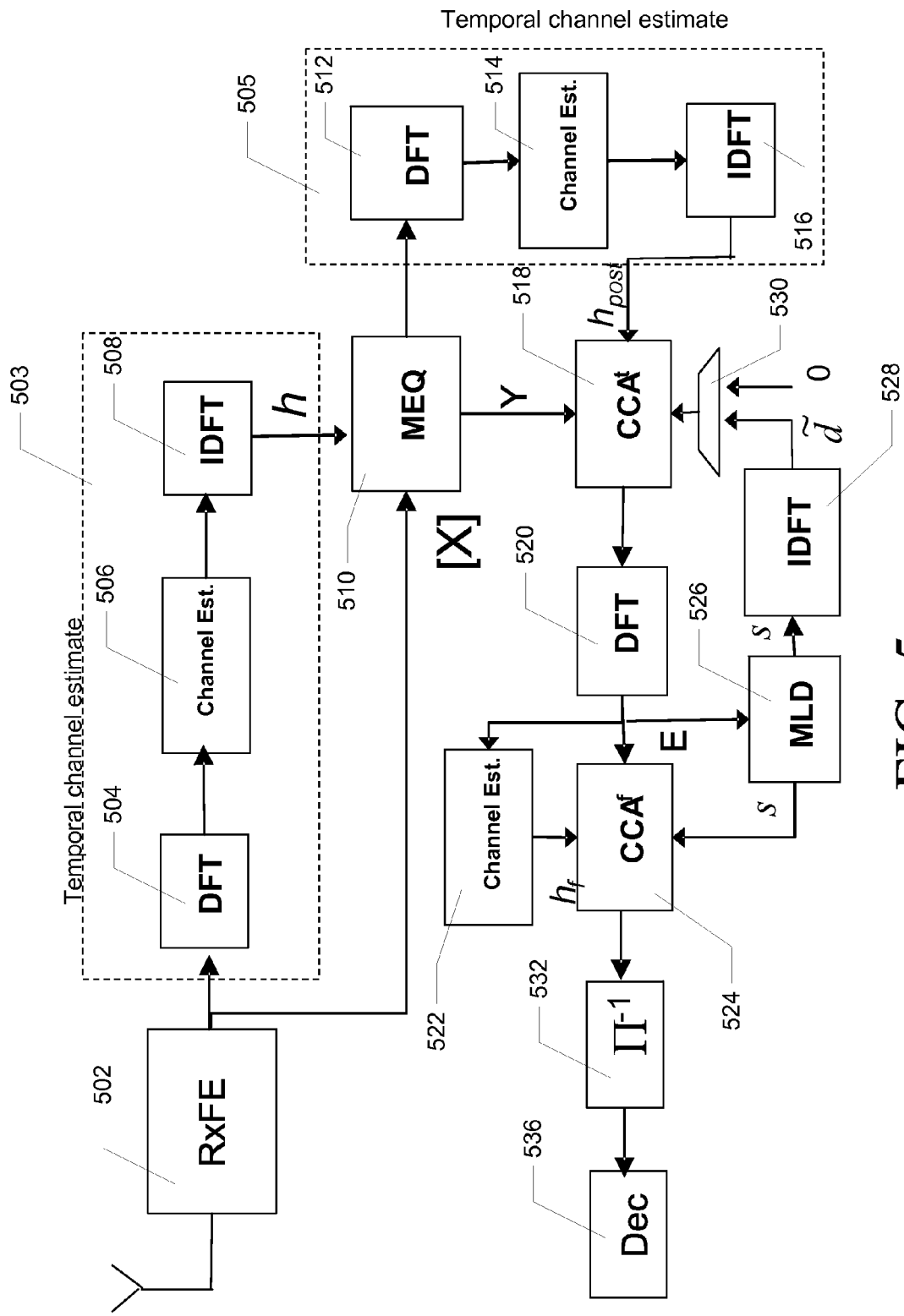
FIG. 5 is a block diagram of a receiver architecture of a wireless communication system, in accordance with certain configurations of the present disclosure.

FIG. 5 shows a receiver architecture configured with a discrete Fourier transform (DFT) pre-decoder block 504 and a multiple stream equalizer (MEQ) block 510 in a pre-coded system according to aspects of the disclosure. The receiver 500 includes a receive front end block 502 coupled to the DFT pre-decoder block 504. The DFT pre-decoder block 504 is coupled to a channel estimator block 506 that is coupled to an inverse discrete Fourier transform (IDFT) demodulator block 508. The MEQ block 510 is coupled to the receiver front end block 502 and the IDFT block 508. The receive front end block 502 captures the transmitted data and the DFT pre-decoder block 504 performs a discrete Fourier transform on the data to generate frequency domain received symbols.

This architecture includes two temporal channel estimate blocks 503, 505, each with a DFT pre-decoder block 504, 512, channel estimation block 506, 514, and inverse DFT block 508, 516. A first temporal channel estimate block 503 takes an input from the receiver front end (RxFE) 502 and outputs to the multipoint equalization (MEQ) block 510. A second temporal channel estimate block 505 takes the output from the MEQ block 510 as an input and outputs to a cyclic coordinate ascend (CCAt) block 518 operating in the time domain. The CCAt block 518 serves to remove residual inter-symbol interference (ISI) that may remain following the MEQ block 510. ISI may be seen in channels with long delays. One main function of the MEQ block 510 is to create a filter that can suppress interference using a signal training sequence as a reference.

According to one aspects of the present disclosure, the MEQ block 510 is driven by temporal parametric channel estimation obtained first by estimating the channel in the frequency domain using pilot symbols or a training sequence, and subsequently taking the IDFT of this frequency domain channel estimate.

According to another aspect of the present disclosure a CCAf block 524 operates in the frequency domain to cancel residual inter-carrier interference (ICI) that may be present in the signal following the CCAt block 518. ICI may be seen in OFDM signals, particularly those with time variation (such as delays, etc. in high speed channels). The CCAf block 524 applies the same principle of cancellation of ISI interference, but in the frequency domain.

The output from the CCAf block 524 are log likelihood ratios (LLRs) that are passed through to the channel decoder (DEC) 536 for further processing. The CCAf block 524 provides the symbol likelihood that can be used as a soft decision for the channel decoder 536. It also suppresses ICI due to non-orthogonality of the subcarriers in non-stationary channels.

To describe certain aspects of the present disclosure in mathematical terms, the pre-coded signal received with co-channel interference and additive white Gaussian noise (AWGN) is:

$$\underline{x}_{N\times 1}=h_{N\times(N+L)}\underline{\tilde{d}}_{(N+L)\times 1}+g_{N\times(N+L)}\underline{\tilde{z}}_{N\times 1}\tilde{v} \qquad (6)$$

in which $\tilde{v}$ represents the AWGN, $g_{N\times(N+L)}$ is a vector representing the channel of the co-channel interference and $\underline{z}_{N\times 1}$ is a vector representing symbols of the co-channel interference that is received at the receiver front end block 502.

According to aspects of the present disclosure, the receiver can apply an adaptive filter using $\tilde{d}_{(N+L)\times 1}$ as a reference to cancel the interference before decoding the signal as long as the equivalent delay spread is within the cyclic prefix. According to another aspect of the present disclosure, the interference cancellation in the receiver front end block 502 can be followed by applying the DFT in DFT pre-decoder block 504 to decode the symbols as shown in equation (7) to generate $\underline{R}_{N\times 1}$.

$$\underline{R}_{N\times 1} = W_{N\times N} f_{N\times N} \underline{x}_{N\times 1} \qquad (7)$$
$$= W_{N\times N} f_{N\times N} h_{N\times(N+L)} C_{(N+L)\times N} W^H_{N\times N} \underline{s}_{N\times 1} +$$
$$W_{N\times N} f_{N\times N} g_{N\times(N+L)} \underline{\tilde{z}}_{N\times 1} + W_{N\times N} f_{N\times N} \underline{v}_{N\times 1}$$
$$= W_{N\times N} \tilde{h}_{f_{N\times N}} W^H_{N\times N} + \tilde{v}_{f_{N\times 1}}$$

In equation (7), $f_{N\times N}$ represents the adaptive filter used to suppress interference and to equalize the signal in the time domain; $h_{N\times(N+L)}$ is the effective channel response including pulse shape; and $\tilde{h}_{f_{N\times N}}=f_{N\times N}h_{N\times(N+L)}$.

The MEQ block 510 performs spatio-temporal multi-stream blind interference cancellation based on received samples $\underline{x}_{N\times 1}$ as set forth in Equation (6).

For minimum mean square error (MMSE) and full column rank, more columns are added by Spatial temporal stacking in which:

$$\underline{X}k=[\underline{x}^T(k)\underline{x}^T(k-1)\ldots\underline{x}^T(k-L)]^T$$

$$\underline{D}_k=[\tilde{d}_k\tilde{d}_{k+1}\ldots\tilde{d}_{k+L-1}]^T$$

Given $$[X]=[\underline{X}_k,\underline{X}_{k-1},\ldots,\underline{X}_{k-N-1}],M(\delta+1)\times N \qquad (8)$$

$$[D]=[\underline{D}_k,\underline{D}_{k+1},\ldots,\underline{D}_{k+N-1}],L\times N \qquad (9)$$

The interference suppression filter is applied to W by training on the reference:

$$W=[D][X]^H\{[X][X]^H\}^{-1}, L\times M(\delta+1) \qquad (10)$$

It can be shown that:

$$[D][X]^H \approx NH^H (\text{for } N \gg 1) \text{ where for } M = 1 \qquad (11)$$

$$H = \begin{bmatrix} h_0 & h_1 & \ldots & h_{L-1} & 0 & \ldots & 0 \\ 0 & h_0 & h_1 & \ldots & h_{L-1} & \ldots & 0 \\ \vdots & & \vdots & & \vdots & & \\ 0 & 0 & 0 & \ldots & & & h_{L-1} \end{bmatrix}_{\delta\times(L+\delta-1)} \qquad (12)$$

Referring to equations (10) and (11), it is shown that:

$$W = NH^H\{[X][X]^H\}^{-1}, L\times M(\delta+1) \qquad (13)$$
$$= H^H R_{xx}^{-1} \text{ where, } R_{xx} = \left(\frac{1}{N}\right)[X][X]^H$$

$$W = H^H R_{xx}^{-1}, L\times M(\delta+1) \qquad (14)$$

in which W is matrix and consists of multiple filters tuned to different echoes of the signal. Because channel delay spread is L, there will be L such echoes.

$$W=[f_1 f_2 \ldots f_L]^T, L\times M(\delta+1) \qquad (15)$$

As long as delay spread of $f_1 \otimes h$ remains less than the cyclic prefix the circulant properties remain intact.

Equation (13) shows the channel estimates h from the temporal channel estimate block 503 to the MEQ block 510 are used by the MEQ block 510 to compute the MEQ filter weights. As described above, the channel estimation is performed by taking a DFT of received samples and using the knowledge of training sequence symbols, which are spread across the burst. According to aspects of the present disclosure, the channel is estimated in frequency domain and then transformed back in the time domain by performing an IDFT in the IDFT block 508.

According to aspects of the present disclosure, additional channel estimation is performed in the temporal channel estimate block 505 using output from the MEQ block 510. The DFT block 512 transforms output from the MEQ block 510 from the time domain to the frequency domain so that a post MEQ channel estimation can be performed in the frequency domain by the channel estimation block 514. The IDFT block 516 then transforms the post MEQ channel estimation from the frequency domain back to the time domain.

The MEQ filtered streams are then combined temporally using the CCAt block 518. The CCAt block 518 suppresses residual ISI due to dispersive channels for which channel impulse response length is comparable or exceeding the cyclic prefix length as shown in Equation 16 below.

In Equation 16, $\hat{H}$ represents the post-MEQ channel estimates provided from the IDFT block in time-domain to the CCAt block 518 and Y represents M streams of multistream output from the MEQ block 510.

The DFT block 520 transforms output from the CCAt block 518 from the time domain to the frequency domain. Additional frequency domain channel estimations are performed in the channel estimator block 522, as they were performed in the previous channel estimation blocks 506, 514.

Reference symbols $\tilde{d}$ are obtained by performing maximum likelihood decoding (MLD) in the MLD block 526 on the output of the DFT block 520 followed by taking an IDFT in IDFT block 528 to regenerate the precoded reference symbol data d̃. The reference symbols d̃ are provided iteratively to the CCAt block 518 by a multiplexer block 530.

$$z_k = \frac{1}{\|\hat{H}\|^2} \sum_{i=1}^{M} \left[ \sum_{j=-L}^{L} Y_{i,k+j} \hat{H}_{i,j}^* - \sum_{j=-L}^{L} \hat{H}_{i,j}^* \sum_{m=-L, m\ne j}^{L} \hat{H}_{i,m} \tilde{d}_{k+j-m} \right] \quad (16)$$

Temporal CCA performed by the CCAt block 518 has two parts shown in equation (16) in which the term:

$$\sum_{j=-L}^{L} Y_{i,k+j} \hat{H}_{i,j}^* \quad (17)$$

represents the matched filtering, and the term $$\sum_{j=-L}^{L} \hat{H}_{i,j}^* \sum_{m=-L, m\ne j}^{L} \hat{H}_{i,m} \tilde{d}_{k+j-m} \quad (18)$$

represents ISI estimation.

According to one aspect of the present disclosure log likelihood ratios (LLRs) are obtained after a re-estimate of the channel in frequency domain by a CCAf block 524. According to aspects of the present disclosure, the CCAf block 524 provides the symbol likelihood that can be used as a soft decision input for the channel decoders. The CCAf block 524 also suppresses ICI due to non-orthogonality of the subcarriers in non-stationary channel.

The CCAf block 524 performs a re-estimate of the channel in the frequency domain as shown in Equation (19) based on pilot symbols Ĥf provided by the channel estimation block 522, output E of the DFT block 520 and reference symbols S obtained by performing a maximum likelihood detection upon the output of the DFT block 520 in the MLD block 526. Ĥf is a N×N matrix where N is the number of subcarriers. If no ICI is present, Ĥf is a diagonal matrix. The output $z_k$ of a multi-stream CCA at time k may be expressed as a matched filter plus ICI cancellation.

$$z_k = \frac{1}{\|\hat{H}_k^f\|^2} \sum_{i=1}^{N} \left[ \hat{H}_{i,k}^{f*} E_i - \hat{H}_{i,k}^{f*} \sum_{\substack{j=1 \\ j\ne k}}^{N} \hat{H}_{i,j}^{f} S_j \right] \quad (19)$$

in which the term $$\hat{H}_{i,k}^{f*} E_i$$

represents the matched filtering, and the term $$\hat{H}_{i,k}^{f*} \sum_{\substack{j=1 \\ j\ne k}}^{N} \hat{H}_{i,j}^{f} S_j$$

represents the ICI estimation.

According to aspects of the present disclosure, the estimate for the ISI cancelled symbol $\hat{s}_k$ is represented by Equation 20.

$$\hat{s}_k = MLD(y_k) \quad (20)$$

The symbol log-likelihood, $L(s_k)$ is represented Equation 21:

$$L(s_k) = 2\|\hat{H}_k^f\|^2 Re\{y_k s_k^*\}/\sigma^2 + \|\hat{H}_k^f\|^2 |s_k|^2/\sigma^2 \quad (21)$$

in which $\sigma^2$ represents the noise variance.

The demodulator block 532 and decoder block 536 demodulates the symbols based on the symbol log-likelihood $L(s_k)$.

Figure 6:
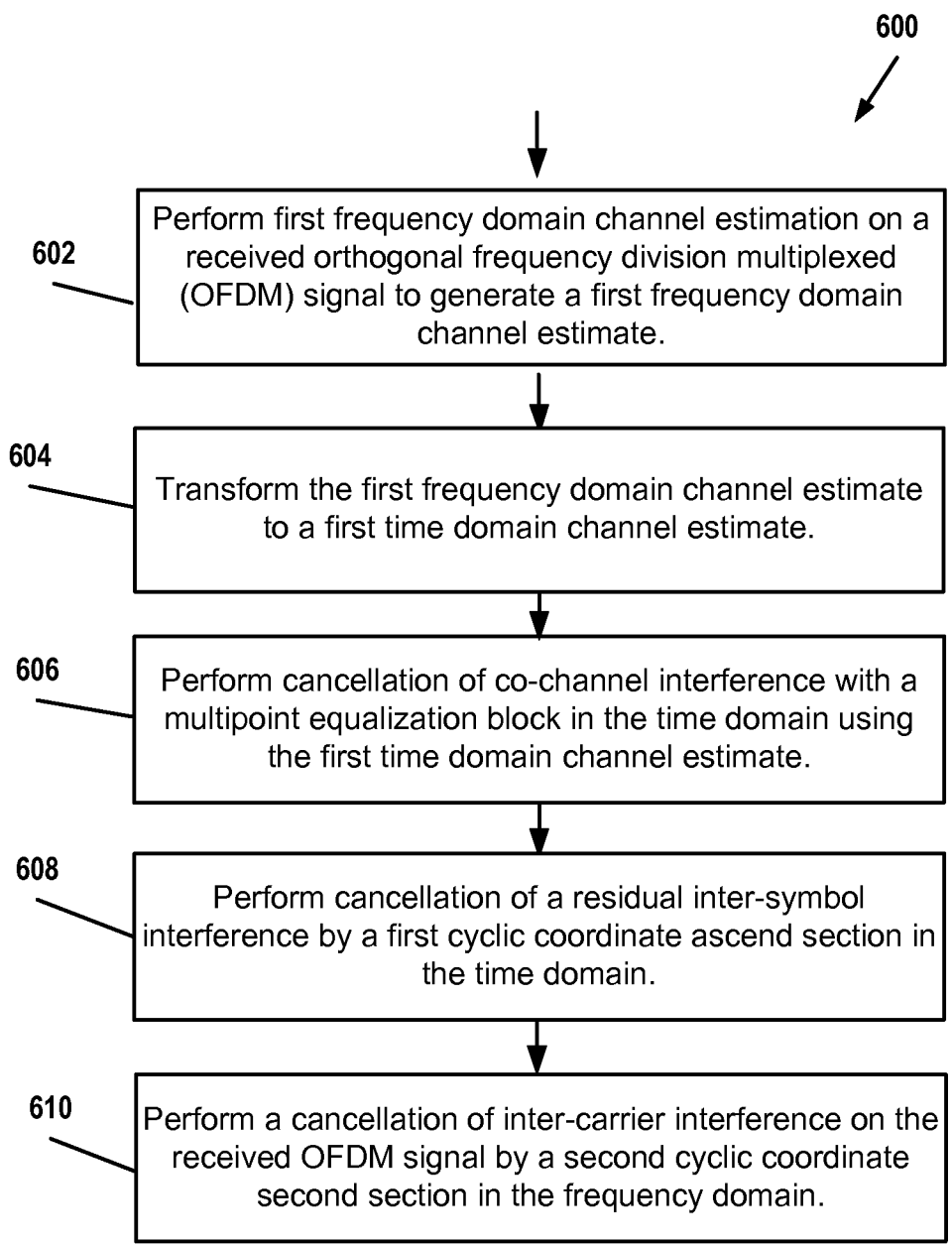
FIG. 6 is a flow chart of an exemplary equalization and interference cancellation process in accordance with certain configurations of the present disclosure.

FIG. 6 is a flow chart of an exemplary interference cancellation process 600 in accordance with certain configurations of the present disclosure. In block 602, a first frequency domain channel estimation is performed on a received orthogonal frequency division multiplexed (OFDM) signal to generate a first frequency domain channel estimate. In block 604, the first frequency domain channel estimate is transformed to a first time domain channel estimate. In block 606, cancellation of co-channel interference is performed with a multipoint equalization block in the time domain using the first time domain channel estimate. In block 608, cancellation of a residual inter-symbol interference is performed by a first cyclic coordinate ascend section in the time domain. In block 610, a cancellation of inter-carrier interference on the received OFDM signal is performed by a second cyclic coordinate second section in the frequency domain.

According to one aspect of the present disclosure an apparatus for wireless communication includes means for performing a first frequency domain channel estimation on a received OFDM signal to generate a first frequency domain channel estimate, means for transforming the first frequency domain channel estimate to a first time domain channel estimate, and means for performing a cancellation of co-channel interference with a multipoint equalization block in the time domain using the first time domain channel estimate. Referring to FIG. 2, the means for performing a first frequency domain channel estimation on a received OFDM signal to generate a first frequency domain channel estimate, means for transforming the first frequency domain channel estimate to a first time domain channel estimate, and means for performing a cancellation of co-channel interference with a multipoint equalization block in the time domain using the first time domain channel estimate may be the receive processor 238, the control processor 240 and/or the memory 242 configured to perform the functions recited by the means. The receive processor 238, the control processor 240 and/or the memory 242 are also examples of the means for performing a cancellation of residual inter-symbol interference by a first cyclic coordinate ascend section in the time domain, and means for performing a cancellation of inter-carrier interference on the received OFDM signal by a second cyclic coordinate ascend section in the frequency domain.

Figure 7:
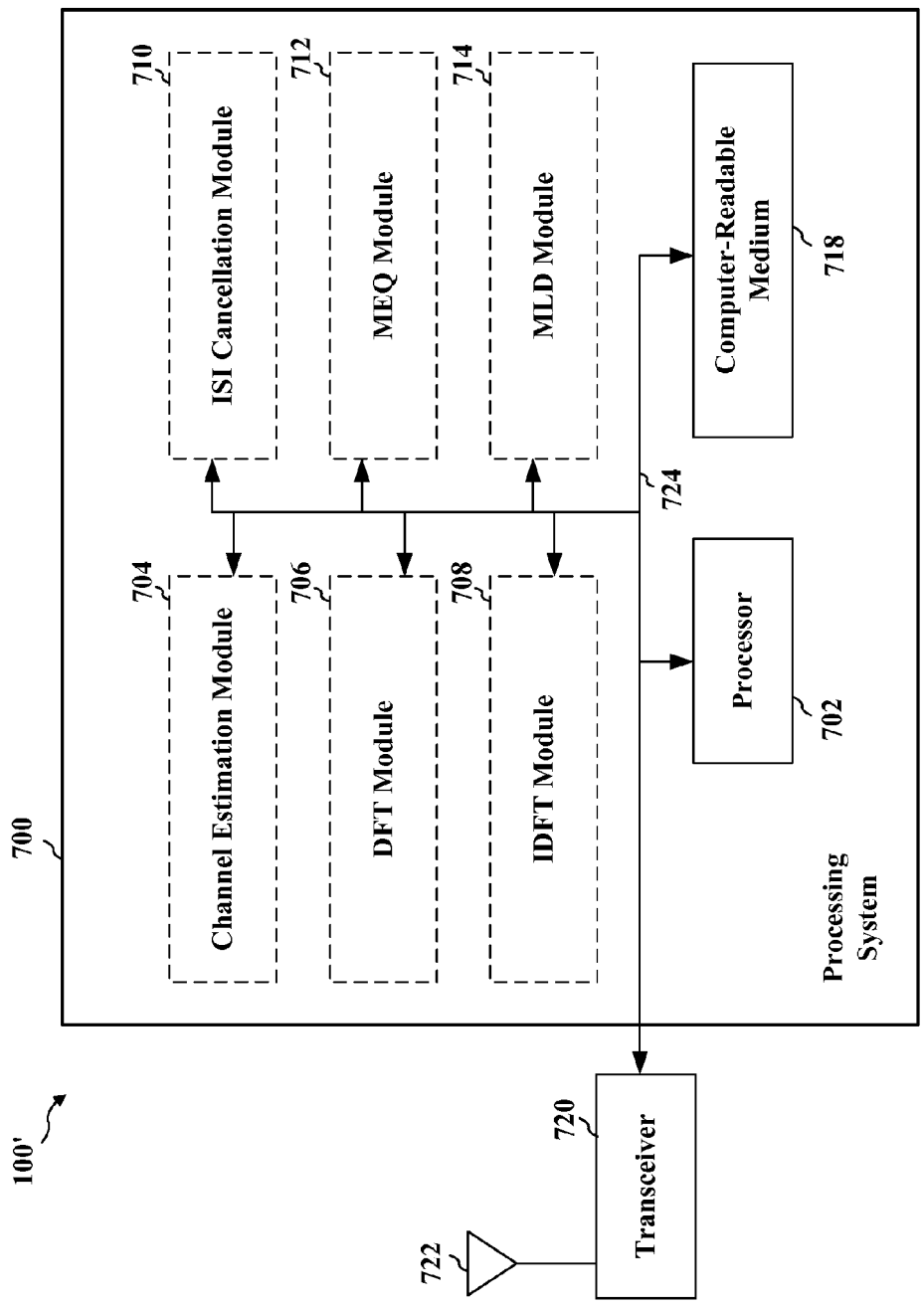
FIG. 7 is a block diagram illustrating a processing system in accordance with certain other configurations of the present disclosure.

FIG. 7 is a diagram illustrating an example of a hardware implementation for an apparatus 100' employing a processing system 700. The processing system 714 may be implemented with a bus architecture, represented generally by the bus 724. The bus 724 may include any number of interconnecting buses and bridges depending on the specific application of the processing system 700 and the overall design constraints. The bus 724 links together various circuits including one or more processors and/or hardware modules, represented by the processor 702, the modules 704, 706, 708, 710, 712, 714 and the computer-readable medium 718. The bus 724 may also link various other circuits such as timing sources, peripherals, voltage regulators, and power management circuits, which are well known in the art, and therefore, will not be described any further.

The apparatus includes the processing system 700 coupled to a transceiver 720. The transceiver 720 is coupled to one or more antennas 722. The transceiver 720 provides a means for communicating with various other apparatus over a transmission medium. The processing system 700 includes the processor 702 coupled to a computer-readable medium 718. The processor 702 is responsible for general processing, including the execution of software stored on the computer-readable medium 718. The software, when executed by the processor 702, causes the processing system 700 to perform the various functions described supra for any particular apparatus. The computer-readable medium 718 may also be used for storing data that is manipulated by the processor 702 when executing software. The processing system 700 further includes a channel estimation module 704, a DFT module 706, an IDFT module 708, an ISI cancellation module 710, a multi-point equalization (MEQ) module 712 and a maximum likelihood detector (MLD) module 714. The modules 704, 706, 708, 710, 712, 714 may be software modules running in the processor 702, resident/stored in the computer readable medium 718, one or more hardware modules coupled to the processor 702, or some combination thereof. The processing system 700 may be a component of the receiver 132 and may include the memory 242 and/or at least one of the TX processor 220, the RX processor 238, and the controller/processor 240.

In one configuration, the apparatus 100/100' for wireless communication includes means for performing a first frequency domain channel estimation on a received OFDM signal to generate a first frequency domain channel estimate, means for transforming the first frequency domain channel estimate to a first time domain channel estimate, and means for performing a cancellation of co-channel interference with a multipoint equalization block in the time domain using the first time domain channel estimate. The apparatus 100/100' also has means for performing a cancellation of residual inter-symbol interference by a first cyclic coordinate ascend section in the time domain; and means for performing a cancellation of inter-carrier interference on the received OFDM signal by a second cyclic coordinate ascend section in the frequency domain. The aforementioned means may be one or more of the aforementioned modules of the apparatus 100' and/or the processing system 700 of the apparatus 100' configured to perform the functions recited by the aforementioned means. As described supra, the processing system 700 may include the TX Processor 220, the RX Processor 238, and/or the controller/processor 240. As such, in one configuration, the aforementioned means may be the TX Processor 220, the RX Processor 238, and the controller/processor 240 configured to perform the functions recited by the aforementioned means.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative sections, blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "operation for."

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication comprising:
receiving a precoded orthogonal frequency division multiplexed (OFDM) signal;
transforming the precoded OFDM signal to a frequency-domain to generate a received frequency-domain OFDM signal;
performing, by a first channel estimator, a first frequency-domain channel estimation on the received frequency-domain OFDM signal to generate a first-frequency domain channel estimate;
transforming the first frequency-domain channel estimate to a first time-domain channel estimate;
performing a cancellation of co-channel interference by a multipoint equalization block in a time-domain using the first time-domain channel estimate and the received precoded OFDM signal;
performing, to a first output of the multipoint equalization block, a cancellation of residual inter-symbol interference by a first cyclic coordinate ascend section in the time domain after performing the cancellation of co-channel interference;
transforming, to the frequency-domain, a time-domain output of the first cyclic coordinate ascend section;
performing a cancellation of inter-carrier interference on the received precoded OFDM signal by a second cyclic coordinate ascend section using the frequency-domain transformed output of the first coordinate ascend section after performing the cancellation of residual inter-symbol interference;

transforming a second output of the multipoint equalization block from the time-domain to the frequency-domain to generate a frequency-domain equalized output;

performing, by a second channel estimator, a second frequency-domain channel estimation on the frequency-domain equalized output to generate a second frequency-domain channel estimate;

transforming the second frequency-domain channel estimate to a second time-domain channel estimate; and performing cancellation of residual inter-symbol interference by the first cyclic coordinate ascend section in the time-domain to the second time-domain channel estimate.

2. The method of claim 1, further comprising:

transforming the precoded time domain OFDM signal to the frequency domain by performing a discrete Fourier transform (DFT) on the precoded time domain OFDM signal; and transforming the first frequency domain channel estimate to the first time domain channel estimate by performing an inverse discrete Fourier transform (IDFT) on the first frequency domain channel estimation.

3. The method of claim 1, further comprising:

transforming a time domain output from the first cyclic coordinate ascend section to generate a frequency domain output; and providing the frequency domain output from the first cyclic coordinate ascend section to the second cyclic coordinate ascend section.

4. The method of claim 3, further comprising:

transforming the time domain output from the first cyclic coordinate ascend section to the frequency domain by performing a discrete Fourier transform on the time domain output from the first cyclic coordinate ascend section.

5. The method of claim 3, further comprising:

performing a second frequency domain channel estimation on an output from the first cyclic coordinate ascend section; and performing the cancellation of inter-carrier interference on the received OFDM signal by the second cyclic coordinate ascend section in the frequency domain based on the second frequency domain channel estimation.

6. The method of claim 1, further comprising providing log likelihood ratios for a decoder by the second cyclic coordinate ascend section.

7. The method of claim 1, further comprising performing the first frequency domain channel estimation based on a training sequence in the received OFDM signal.

8. An apparatus for wireless communication, comprising:

means for receiving a precoded orthogonal frequency division multiplexed (OFDM) signal;

means for transforming the precoded OFDM signal to a frequency-domain to generate a received frequency-domain OFDM signal;

means for performing, by a first channel estimator, a first frequency-domain channel estimation on the received frequency-domain OFDM signal to generate a first-frequency domain channel estimate;

means for transforming the first frequency-domain channel estimate to a first time-domain channel estimate;

means for performing a cancellation of co-channel interference by a multipoint equalization block in a time-domain using the first time-domain channel estimate and the received precoded OFDM signal;

means for performing, to a first output of the multipoint equalization block, a cancellation of residual inter-symbol interference by a first cyclic coordinate ascend section in the time domain after performing the cancellation of co-channel interference;

means for transforming, to the frequency-domain, a time-domain output of the first cyclic coordinate ascend section;

means for performing a cancellation of inter-carrier interference on the received precoded OFDM signal by a second cyclic coordinate ascend section using the frequency-domain transformed output of the first coordinate ascend section after performing the cancellation of residual inter-symbol interference;

means for transforming a second output of the multipoint equalization block from the time-domain to the frequency-domain to generate a frequency-domain equalized output;

means for performing, by a second channel estimator, a second frequency-domain channel estimation on the frequency-domain equalized output to generate a second frequency-domain channel estimate;

means for transforming the second frequency-domain channel estimate to a second time-domain channel estimate; and means for performing cancellation of residual inter-symbol interference by the first cyclic coordinate ascend section in the time-domain to the second time-domain channel estimate.

9. A non-transitory computer-readable medium having non-transitory program code recorded thereon, the program code comprising:

program code to receive a precoded orthogonal frequency division multiplexed (OFDM) signal;

program code to transform the precoded OFDM signal to a frequency-domain to generate a received frequency-domain OFDM signal;

program code to perform a first frequency domain channel estimation on the received frequency-domain OFDM signal to generate a first frequency-domain channel estimate;

program code to transform the first frequency-domain channel estimate to a first time-domain channel estimate;

program code to perform a cancellation of co-channel interference by a multipoint equalization block in a time-domain using the first time-domain channel estimate and the received precoded OFDM signal;

program code to perform, to a first output of the multipoint equalization block, a cancellation of residual inter-symbol interference by a first cyclic coordinate ascend section in the time-domain after performing the cancellation of co-channel interference;

program code to transform, to the frequency-domain, a time-domain output of the first cyclic coordinate ascend section;

program code to perform a cancellation of inter-carrier interference on the received precoded OFDM signal by a second cyclic coordinate ascend section using the frequency-domain transformed output of the first coordinate ascend section after performing the cancellation of residual inter-symbol interference;

program code to transform a second output of the multipoint equalization block from the time-domain to the frequency-domain to generate a frequency-domain equalized output;
program code to perform, by a second channel estimator, a second frequency-domain channel estimation on the frequency-domain equalized output to generate a second frequency-domain channel estimate;
program code to transform the second frequency-domain channel estimate to a second time-domain channel estimate; and
program code to perform cancellation of residual inter-symbol interference by the first cyclic coordinate ascend section in the time-domain to the second time-domain channel estimate.

10. An apparatus for wireless communication, comprising:
a memory; and
at least one processor coupled to the memory, the at least one processor being configured:
  to receive a precoded orthogonal frequency division multiplexed (OFDM) signal;
  to transform the precoded OFDM signal to a frequency-domain to generate a received frequency-domain OFDM signal;
  to perform a first frequency domain channel estimation on the received frequency-domain OFDM signal to generate a first frequency-domain channel estimate;
  to transform the first frequency-domain channel estimate to a first time-domain channel estimate;
  to perform a cancellation of co-channel interference by a multipoint equalization block in a time-domain using the first time-domain channel estimate and the received precoded OFDM signal;
  to perform, to a first output of the multipoint equalization block, a cancellation of residual inter-symbol interference by a first cyclic coordinate ascend section in the time-domain after performing the cancellation of co-channel interference;
  to transform, to the frequency-domain, a time-domain output of the first cyclic coordinate ascend section;
  to perform a cancellation of inter-carrier interference on the received precoded OFDM signal by a second cyclic coordinate ascend section using the frequency-domain transformed output of the first coordinate ascend section after performing the cancellation of residual inter-symbol interference;
  to transform a second output of the multipoint equalization block from the time-domain to the frequency-domain to generate a frequency-domain equalized output;
  to perform, by a second channel estimator, a second frequency-domain channel estimation on the frequency-domain equalized output to generate a second frequency-domain channel estimate;
  to transform the second frequency-domain channel estimate to a second time-domain channel estimate; and
  to perform cancellation of residual inter-symbol interference by the first cyclic coordinate ascend section in the time-domain to the second time-domain channel estimate.

11. The apparatus of claim 10, in which the at least one processor is further configured:
  to transform the precoded time domain OFDM signal to the frequency domain by performing a discrete Fourier transform (DFT) on the precoded time domain OFDM signal; and
  to transform the first frequency domain channel estimate to the first time domain channel estimate by performing an inverse discrete Fourier transform (IDFT) on the first frequency domain channel estimation.

12. The apparatus of claim 10, in which the at least one processor is further configured:
  to transform a time domain output from the first cyclic coordinate ascend section to generate a frequency domain output; and
  to provide the frequency domain output from the first cyclic coordinate ascend section to the second cyclic coordinate ascend section.

13. The apparatus of claim 12, in which the at least one processor is further configured to transform the time domain output from the first cyclic coordinate ascend section to the frequency domain by performing a discrete Fourier transform on the time domain output from the first cyclic coordinate ascend section.

14. The apparatus of claim 12, in which the at least one processor is further configured:
  to perform a second frequency domain channel estimation on an output from the first cyclic coordinate ascend section; and
  to perform the cancellation of inter-carrier interference on the received OFDM signal by the second cyclic coordinate ascend section in the frequency domain based on the second frequency domain channel estimation.

15. The apparatus of claim 10, in which the at least one processor is further configured to provide log likelihood ratios for a decoder by the second cyclic coordinate ascend section.

16. The apparatus of claim 10, in which the at least one processor is further configured to perform the first frequency domain channel estimation based on a training sequence in the received OFDM signal.

* * * * *